Sept. 3, 1935.  M. R. DAY  2,013,553
FIBER RUBBER PRODUCT
Filed Nov. 18, 1932
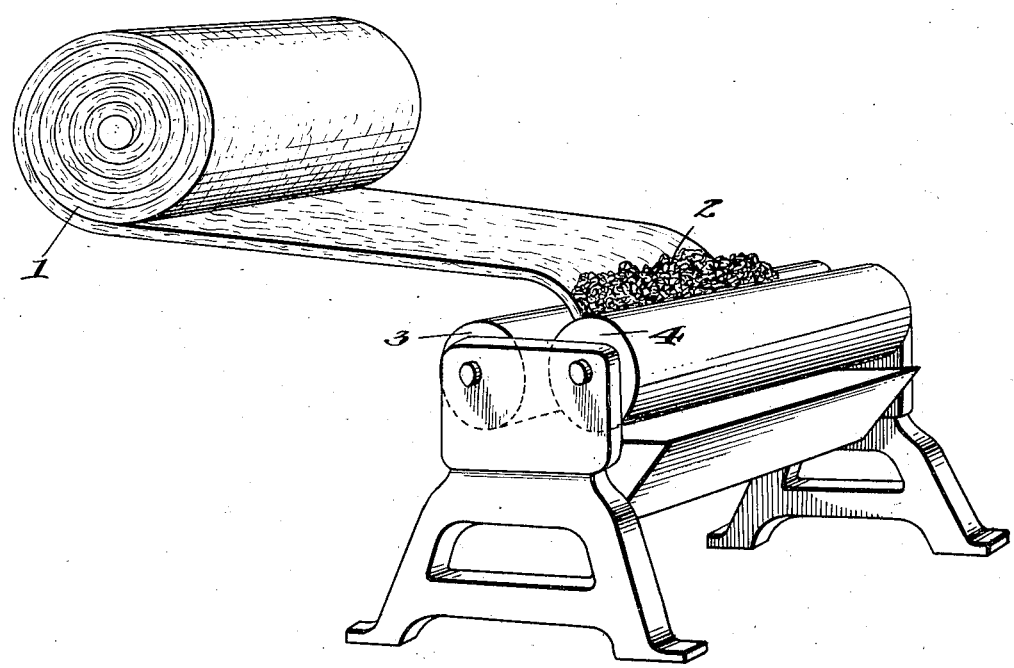
Inventor:
Morgan R. Day
per William B. (illegible)
Att'y.

Patented Sept. 3, 1935

2,013,553

UNITED STATES PATENT OFFICE

2,013,553

FIBER-RUBBER PRODUCT

Morgan R. Day, Watertown, Mass., assignor to Dewey and Almy Chemical Company, Cambridge, Mass., a corporation of Massachusetts Application November 18, 1932, Serial No. 643,208

3 Claims. (Cl. 106—23)

This invention relates to fiber-reinforced rubber articles, more particularly to a process for introducing relatively long fibers into a milled rubber composition; and it generally comprises orienting fibers, such as on a carding or garnetting machine, and milling the so oriented fibers into a rubber composition; all as more fully hereinafter described and claimed.

Finely comminuted fibrous material, e. g., cotton flock, is commonly milled into rubber compositions as a filler therefor and to impart a suedelike appearance to the surface of the finished rubber articles. Such finely divided fibrous material is altogether too short, however, to act as an extension reinforcing material as is commonly desired in shoe soles, tread material, artificial leather, and the like.

But while finely divided fibrous material is used for rubber compounding purposes, it is well known that if an attempt be made to mill relatively long fibers such as cotton, wool, ramie, etc., into a rubber composition, the fibers clump together with consequent formation of an unhomogeneous mass and very great comminution of the fibers, thus defeating essential objects of the process. The stream line flow of the rubber composition as it passes between the revolving rolls of the mill tends to orient randomly disposed fibers which have been added thereto; but the orienting process is soon arrested by a knotting and snarling of the fibers.

As a means of overcoming these disadvantages, U. S. P. 1,702,225 issued to William Burton Wescott describes a process for introducing relatively long fibers into a rubber composition which comprises rubberizing the randomly arranged fibers by impregnation with a latex composition before milling them into the rubber. While this process is quite practical and commercially used, it is expensive and attended with several disadvantages. The enveloping skin of rubber greatly facilitates separation of the fibers by the rubber mass and their distribution through the rubber composition; but even here the untangling of the fibers and accompanying orientation by and dispersion in the rubber compound is attended by extensive fiber comminution.

An object of the present invention is to provide a cheaper and more practical process than any heretofore known for the introduction of relatively long fibers into a milled rubber composition. Another object is to provide a process for dispersing relatively long fibers through a milled rubber composition with greater uniformity and with less accompanying comminution or shortening of the fibers than has heretofore been possible. Still another object is to provide fiber-reinforced rubber articles possessing greater flexibility in one direction. Other objects and advantages of the invention will become apparent with its more detailed description.

I have discovered that relatively long fibers may be advantageously milled into a rubber composition if the fibers are first oriented so that they all lie in substantially the same direction. As suitable fibers I may employ any filamentary material such as asbestos, as well as the more conventional fibrous materials such as cotton, wool, ramie, jute, and the like, which is of sufficient length to be adapted to any of the well known fiber orienting processes. In addition to the employment of loose unfabricated fibers I have found that material such as towel shearings, underwear clippings, and the like may be subjected to a suitable shredding process, the shredded material subjected to a fiber orienting process, and the resulting product milled into a rubber composition with advantageous results. The word "fiber" as employed in the present specification and claims is therefore used in a broad generic sense which may include threads, cords, and like filamentary materials.

For the purpose of suitably orienting the fibers I generally prefer to use a garnetting machine. A similar effect may be accomplished, however, by carding the fibers or subjecting them to any processes which will cause them all to lie in substantially the same direction. It will be apparent to those skilled in the art that when it is desired to make a colored fiber-rubber article, the fibers may be dyed to the desired color and shade before they are subjected to the orienting procedure.

After the fibers have been suitably oriented, they are added to the rubber composition in the form of a thin bat or sheet material. An advantageous result is obtained regardless of the direction in which the oriented fibers are presented to the rubber on the mill; but a somewhat better result is obtained when the fibers are presented in a direction normal to the axes of the rolls of the mill. In this manner less shortening of the fibers occurs than when they are presented parallel or obliquely to the axes. For most purposes a weight of fibrous material equal to 25–50% of the weight of rubber compound is used; but it is possible according to the present invention to mill together equal quantities of fiber and rubber compound.

The process of this invention possesses advantages for use with either even or uneven speed mills, i. e. mills of which the peripheral speeds of the masticating rolls are the same or different respectively; but it is most generally and advantageously applicable to uneven speed mills because they are more commonly used and have always presented greater difficulties to the introduction of filamentary materials into rubber compounds masticated thereon. When the oriented fibers are introduced on even speed mills, or even when introduced on uneven speed mills normal to the axes of the rolls without cutting and folding of the composition on the mill as is common in rubber mill practice, the general oriented condition of the fiber largely persists in the completed rubber articles. Such orientation is advantageous when it is desired to prepare articles which possess greater flexibility in one direction, i. e., which are more flexible in the direction at right angles to the line of the fibers and which are relatively stiff in the direction of the fibers. This property is particularly advantageous in certain products such as shoe soles where flexibility is desired lengthwise of the sole and stiffness across the sole.

Inasmuch as some shortening of the fibers will occur under any conditions, it is generally desirable to mill compounding and pigmenting agents into the rubber composition before the fibers are introduced. In this manner a minimum comminution of the fibers occurs.

In the drawing, 1 designates a roll of fibrous material in which the fibers all lie in substantially the same direction; 2 represents a rubber composition into which the fibrous material is to be incorporated; and 3 and 4 designate milling rolls such, for example, as are found on the ordinary rubber mill.

The following is a detailed description of a manner in which my invention may be performed:

Long cotton fibers which have been dyed brown are formed into a thin bat on a garnetting machine. Twenty-five parts of the garnetted material are then slowly fed into a rubber composition on a mill which has been prepared from the following materials in accordance with usual rubber compounding practice:

| | Parts |
|---|---|
| Rubber (smoked sheet) | 100 |
| Sulfur | 3 |
| Zinc oxide | 5 |
| Diphenyl guanidine | ¾ |
| Clay | 10 |
| Red oxide | 5 |
| Carbon black | 1 |

The fibrous material is presented to the rubber composition on an uneven speed mill in such a manner that the direction of the fibers is substantially normal to the axes of the rolls of the mill. As soon as the fibers have been thoroughly worked into the mass, the compound is formed into sheets of any desired thickness by passing it between calender rolls. It is desirable, but not necessary, to calender the material in the same direction that it has been milled. Then the grain of the rubber and the parallel disposition of the fibers which has largely persisted through the milling operation remain practically undisturbed. The calendered material may be vulcanized in known manner in sheet form, such as when the finished article is to be employed as a floor covering material, or suitable shapes may be died from the calendered sheets and the died pieces cured in a mold as in the manufacture of shoe soles. In the latter case the pieces should be died out in such manner that the parallelly disposed fibers of the rubber composition extend lengthwise of the sole. In this manner, as previously stated, a sole is obtained which possesses improved longitudinal flexibility and desirable transverse stiffness. The scrap obtained by dieing irregularly shaped pieces from calendered sheets may be remilled and reused. Articles formed from remilled scrap do not possess to the same extent the advantageous properties of articles made from freshly milled material because the orientation and length of the fibers are somewhat disturbed, but are superior in quality to fiber-rubber products prepared in the prior art.

The word "milling" and its derivatives as used in this specification and the appended claims refer to the type of mixing or mastication to which a plastic material is subjected when it is worked between rolls which are revolving in opposite directions in such a manner that the frictional engagement of the rolls on the plastic material causes the latter to flow as it passes through the relatively narrow aperture between the rolls.

It should be understood that the present disclosure is for the purpose of illustration only, and this invention includes all modifications and equivalents which fall within the scope of the appended claims.

Having now fully described my invention, I claim:

1. That process for the manufacture of fiber-reinforced rubber which includes the steps of assembling fibers into substantially parallel relationship by forming a loose web thereof, and then simultaneously feeding the web and rubber between the masticating rolls of a rubber mill.

2. That process for the manufacture of fiber-reinforced rubber which comprises feeding a web of loosely felted, relatively long fibers into a rubber mill in a direction normal to the masticating rolls and simultaneously feeding rubber into the rolls, whereby the length of the fibers is substantially maintained.

3. That process for the manufacture of fiber-reinforced rubber which includes the steps of assembling fibers into substantially parallel relationship by forming a loose web thereof, and then simultaneously feeding the web and rubber between the masticating rolls of a rubber mill, whereby a compound containing materially more fiber may be produced.

MORGAN R. DAY.